H. G. Eastman.
Hand Support.
Nº 41,495. Patented Feb. 9, 1864.

Witnesses:
David Bruce
O. L. Barritt

Inventor:
H. G. Eastman

UNITED STATES PATENT OFFICE.

H. G. EASTMAN, OF POUGHKEEPSIE, NEW YORK.

PENMAN'S ASSISTANT.

Specification forming part of Letters Patent No. 41,495, dated February 9, 1864.

*To all whom it may concern:*

Be it known that I, H. G. EASTMAN, of Poughkeepsie, Dutchess county, State of New York, have invented certain new and useful Improvements on my Improved Penman's Assistant, patented the 5th November, 1861; and I do hereby declare the following to be a full description of the same.

In my invention as patented on the 5th of November, 1861, I used a metal ball with finger-rests attached thereto to control the writer and shape the hand and fingers in using the pen, and at the same time specified that the invention might be modified by making the support for the hand and fingers of a skeleton or glove shape. After some experience as to the practicability of getting the metal balls made with the finger-rests properly adjusted, I find that a skeleton or glove shape or palm or metal glove having the fingers attached can be struck up in dies having the exact conformation of the hand and fingers required with much more ease and accuracy than the metal balls having the finger-rests attached thereto can be made. I have therefore decided to adopt the skeleton or palm shaped conformation of the penman's assistant as the basis upon which I desire to make my improvement, which consists in securing to the middle finger of the assistant in a permanent manner and proper position a fountain-pen or pen-holder case.

But to describe my invention more particularly, I will refer to the accompanying drawings, forming a part of this specification, the same letters of reference, wherever they occur, referring to like parts.

Figure 4:
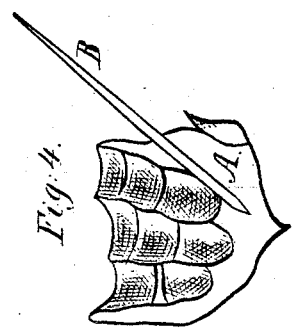
Figure 1:
Figure 3:
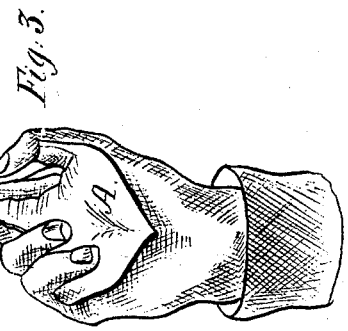
Figure 2:
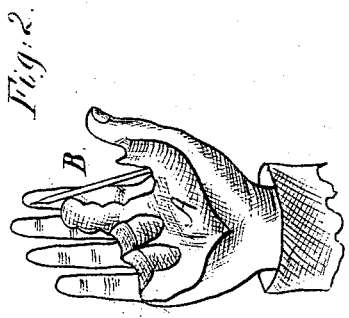

Figure 1 represents the assistant as held by the hand in the act of writing. Fig. 2 represents the palm of the hand extended with the assistant adjusted upon it. Fig. 3 represents the hand as holding the assistant. Fig. 4 is a view of the penman's assistant with the pen-holder attached to the end of the middle finger.

Letter A is the pen-holder formed to fit the palm of the writer's hand when contracted so as to hold the pen between the thumb, fore and middle fingers in the act of writing. This conformation is obtained by first taking a mold in plaster-of-paris of the palm of the hand as arched or contracted in the act of writing. From this mold dies are obtained of the palm and the fingers, which, on account of the sharp bend at the junction of the fingers with the palm, requires it to be made in section when made in metal, though not material if made in hard rubber. These sections are then united together by soldering, so as to form the palm or pen holder. To the side of the long or middle finger is secured a fountain-pen or pen-holder case, B, in such a position as to give the writer a natural and free use of the pen, and at the same time prevent him, especially when a learner, from learning the habit of cramping the fingers, and thus acquiring a bad style of penmanship.

It will be obvious that scales of sizes of the palms will be used, so that the pupil will find no difficulty to make a selection to suit the hand.

Having now described my improvements, I will set forth what I claim and desire to secure by Letters Patent—

The combination of the fountain-pen or pen-holder case B with the palm or hand-support A, whether made of metal, hard rubber, or other substance, for the purposes hereinbefore set forth.

H. G. EASTMAN.

Witnesses:
C. R. WELLS,
E. P. EASTMAN.